(12) United States Patent
Morohoshi et al.

(10) Patent No.: US 7,990,809 B2
(45) Date of Patent: Aug. 2, 2011

(54) MUSIC DATA TRANSFER METHOD, INFORMATION PROCESSING APPARATUS AND INFORMATION RECORDING/PLAYBACK SYSTEM

(75) Inventors: Toshihiro Morohoshi, Kawasaki (JP); Hidehito Izawa, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/501,128

(22) Filed: Jul. 10, 2009

(65) Prior Publication Data

US 2009/0276068 A1    Nov. 5, 2009

Related U.S. Application Data

(62) Division of application No. 11/374,170, filed on Mar. 14, 2006, now Pat. No. 7,606,118.

(30) Foreign Application Priority Data

Mar. 14, 2005    (JP) .................................. 2005-071832

(51) Int. Cl.
*G11B 21/08*    (2006.01)
(52) U.S. Cl. .................................................. 369/30.01
(58) Field of Classification Search ............... 369/30.01, 369/33.01, 30.03, 3.06, 30.08, 47.1; 386/46, 386/230, 265, 353; 711/156
See application file for complete search history.

(56) References Cited

U.S. PATENT DOCUMENTS

| 7,146,322 | B2 * | 12/2006 | Cowgill ..................... 704/270.1 |
| 7,305,527 | B2 | 12/2007 | Matsumoto |
| 2001/0014946 | A1 | 8/2001 | Ichinoi et al. |
| 2005/0287972 | A1 | 12/2005 | Christensen et al. |

FOREIGN PATENT DOCUMENTS

| JP | 2000-010996 | 1/2000 |
| JP | 2002-123273 | 4/2002 |
| JP | 2002-366486 | 12/2002 |
| JP | 2003-162473 | 6/2003 |
| JP | 2003-162474 | 6/2003 |
| JP | 2003-216471 | 7/2003 |
| JP | 2005-044097 | 2/2005 |

OTHER PUBLICATIONS

Japanese Office Action dated Mar. 30, 2010 for Appln. No. 2005-071832.

* cited by examiner

*Primary Examiner* — Ali Neyzari
(74) *Attorney, Agent, or Firm* — Pillsbury Winthrop Shaw Pittman, LLP

(57) ABSTRACT

One embodiment of invention is useful when updating data of a database which is configured to take in data through a network, has a part to be updated, and takes in information of media stored in a local storage, and characterized by that a result of retrieval is outputted with additional information of an updated date/time of information updated by connecting to a network, and the output result is informed.

7 Claims, 5 Drawing Sheets

MUSIC DATA TRANSFER METHOD, INFORMATION PROCESSING APPARATUS AND INFORMATION RECORDING/PLAYBACK SYSTEM

CROSS-REFERENCE TO RELATED APPLICATIONS

This application is a divisional of U.S. application Ser. No. 11/374,170, filed Mar. 14, 2006 now U.S. Pat. No. 7,606,118, and for which priority is claimed under 35 U.S.C. §121. This application is also based upon and claims the benefit of priority from prior Japanese Patent Application No. 2005-071832, filed Mar. 14, 2005. The entire contents of each of the above-identified applications for which priority is claimed is incorporated herein by reference in its entirety.

BACKGROUND

1. Field

One embodiment of the invention relates to a contents transfer method of transferring contents to a portable contents playback unit, and more particularly a transfer method of transferring music contents and additional information simultaneously, an information processing apparatus and information recording/playback system.

2. Description of the Related Art

A portable music playback unit (audio player) capable of storing digital music data in a physical memory (memory card) or a hard disc, and playing music has become popular in recent years.

Music data can be obtained from a CD (Compact Disc)/DVD standard optical disc or a public broadcast supplied through a space wave (terrestrial wave) or a satellite, or by downloading from a specific server (distribution site).

It is disclosed by for example, Japanese Patent Application Publication (KOKAI) No. 2002-123273 discloses an information processing apparatus, which downloads music data, artist name, tune title, album title, release date and related image data from a distribution site (server) through the Internet, and transfers the image data together with these music data to an audio player.

The above document disclosing the audio player (information processing apparatus) does not include a detailed description on a method of managing and handling data and files to be updated for a user to download new data related to already downloaded music data, or to update the downloaded data.

In many cases, an audio player has a small storage capacity compared with a contents management apparatus such as a personal computer. Thus, a function of updating downloaded data and handling unnecessary data is indispensable to satisfy the user.

However, though data can be updated according to a size and date/time, the procedure of uploading and downloading data is too complex for most users.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention is useful when updating data of a database which is configured to take in data through a network, has a part to be updated, and takes in information of media stored in a local storage, and characterized by that a result of retrieval is outputted with additional information of an updated date/time of information updated by connecting to a network, and the output result is informed.

Figure 1:
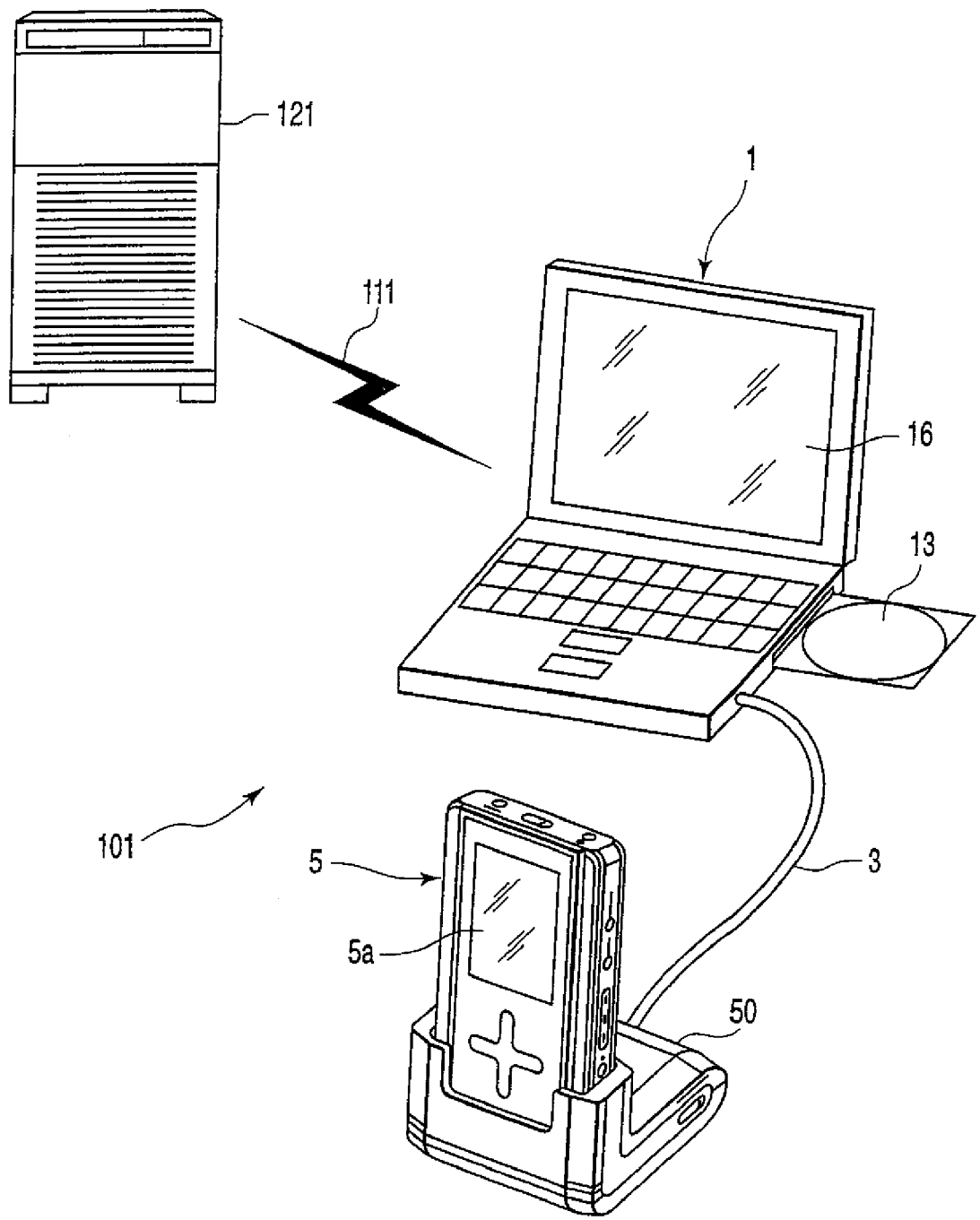
FIG. 1 is an exemplary diagram showing an example of a music contents transfer system or an information processing apparatus, to which an embodiment of the invention is applied.

According to an embodiment FIG. 1 shows schematically the whole aspect of a music playback unit and an information recording/playback system, to which an embodiment of the present invention is applied.

As shown in FIG. 1, an information recording/playback system 101 includes a personal computer (a contents management unit called a PC hereinafter) connectable to a music data suppler, or a server 121 of a distribution site through a network 111 represented by the Internet, and a portable music (contents) player 5 (hereinafter called an audio player) connectable to a PC 1 through a transmission line 3. The network 111 may be a LAN (Local Area Network) provided in the same building or in a limited area, a cable network, or a domestic LAN. The PC 1 may be a host computer or a relay server as long as data can be transferred with the audio player 5.

Figure 2:
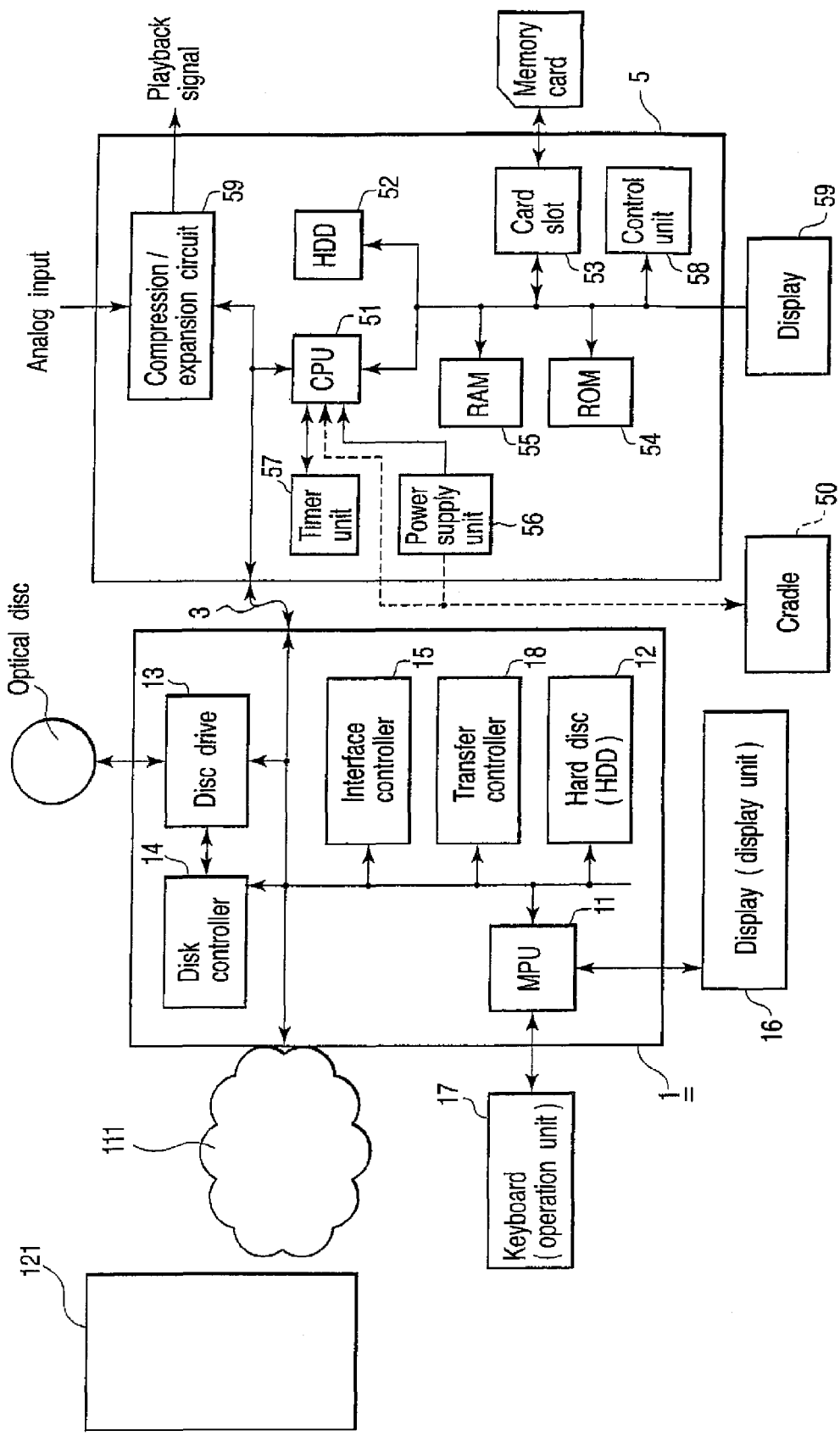
FIG. 2 is an exemplary block diagram of a system configuration of the music contents transfer system according to an embodiment of the invention shown in FIG. 1.

As shown in the block diagram of FIG. 2, the audio player 5 has a main controller 51 (hereinafter called a CPU), and a hard disc drive 52 (hereinafter called a HDD) given a fixed storage capacity. The HDD 52 can store music data (compressed data) and image data (compressed data) in an area except areas to store a firm ware (software to operate the audio player 5, and an application program to play music data supplied from the PC 1). The HDD 52 may be a mobile disc with a unit structure removable from the player 5. Though not described in detail, in addition to the HDD 52 (or instead of the HDD 52), at least one card slot 53 may be provided for transfer of data supplied from a semiconductor (solid body) memory, for example, an SD card, a mini-SD card (registered trademark), a compact flash (registered trademark), and a memory stick (registered trademark).

The audio player 5 has a system memory (ROM) 54 used for playing data stored in the HDD 52 or recording data in the HDD 52, starting the HDD 52, and controlling ON/OFF of a not-shown main power supply, and a cache memory (RAM) 55 used for storing data temporarily.

The audio player 5 has a power supply unit 56 to enable charging of a not-shown built-in battery and operation from a DC voltage of an external power supply, a timer unit 57 used for comparison/management of downloaded music data and date/time of attached data, and a compression/expansion circuit 59 integrated with a compression circuit to compress an analog signal entered directly from a not-shown microphone or a line input terminal, for example, and an expansion circuit to expand a compressed data for outputting a playback signal, in one unit.

Music data 1 or image file (contents) compressed by the PC 1 is transferred to the HDD (mobile disc) 52, and recorded according to a specific rule. In the data compression, MP 3, WMA or WAV is used for the music data, and JPG, GIF or BMP is used for the image data. As a size of image, 75 (pixels)×75 (pixels) or 200 (pixels)×200 (pixels) is set as an optimum size causing a minimum load in the player when paying back (displaying) the data. Though not described in detail, data stored in the HDD 52 is encrypted to permit only direct playing with the player 5 and output to an external speaker as an analog signal, in order to prevent copying (except the predetermined number of times) except for the private use defined in the Copyright Act.

The operation of the player 5 can be controlled by an operation unit 58 including a multifunction button (cross-touch button) used for entering control commands such as for start/stop of playing, switching of information displayed in a display 5a, and scrolling of words (letters) displayed in a display 5a.

As shown in the block diagram of FIG. 2, the PC 1 has a main processor 11 (hereinafter called an MPU) and a hard disc memory unit 12 (hereinafter called a PCHDD) given a fixed storage capacity. Though not explained in detail, the PC 1 also has a disc drive 13 which can read music information or image data from a CD/DVD standard optical disc, a disc controller 14 which reads information from an optical disc set in the disc drive 13 or controls the transfer of data for recording information on an optical disc, and an interface controller 15 used for transferring data with the audio player 5. As an interface, a USB (Universal Serial Bus) is usable. Namely, the transmission line 3 shown in FIG. 1 is a USB cable. The transmission line 3 is removable at a desired timing, and the PC 1 and player 5 has a connector (not shown) to connect the transmission line 3. An interface may be of various known standards, such as, IEEE 1394/802, or a parallel bus.

The PC 1 is also provided with an LCD (Liquid Crystal Display) 16, and a keyboard 17 as an input unit to enter control information to execute download of music contents and transfer of music contents to the audio player 5.

The PCHDD 12 stores music contents (music data) as compressed digital data. The music contents stored in the PCHDD 12 is given an ID tag information (hereinafter called a tag information) in addition to data (music data file). The tag information includes an artist (singer name/player name), tune title, album title, jacket photo, etc.).

These information or data or file is compressed in the PC 1 according to the operation display of operations corresponding to the control commands entered from the keyboard 17 and display 16, and transferred to the audio player 5, when application software (not-explained in detail) held in the transfer controller 18 is started in the PC 1. Though not described in detail, the transfer controller 18 includes an extraction module to extract specific information from music contents (tag information), a conversion module to convert various information obtained from the server (site) 121 to specific formats, and an encryption module to encrypt music contents and obtained various information, and compresses or encrypts these music contents and obtained information to a transferable format.

Next, explanation will be given on the data transfer between the PC and audio player, and data transfer from the PC to the player.

The PC 1 is installed with application software to form compressed data to be stored in the audio player 5, that is, a source including music data and image file represented by CD/DVD, or application for compressing contents supplied from a data supplier or a server to a specific format. When connecting (starting) the audio player 5 for the first time, it is necessary to install the application. In many cases, the application itself is stored in a specific area of the PCHDD 12, and started whenever the PC 1 is started.

When storing music contents from the PC 1 to the audio player 5, or when storing compressed music, data in the HDD 52 of the player 5, there are two methods. One is to play a music CD set in the disc drive 13 and compress the played music as music data (ripping). The other is to access a distribution source (site) through the network 111 and download (compressed) music data from the site. When accessing a distribution source (site) through the network 111, it is possible to obtain various information related to music data. The date and time to obtain the information is specified by the timer unit 57 and held as time information. Thus, when operating the player 5 for the first time (or when the time information is reset by the timer unit 57 because of exhaustion of a battery), it is necessary to enter date/time (time information) from the operation unit 58. (Though not explained in detail, when the time information is reset (or not entered), the firmware requests setting of date/time.)

For example, when the audio player 5 is connected to the PC 1 through the transmission line 3 (USB cable) by using an attached cradle 50, the PC 1 detects the connection of the audio player 5, and a specific application preinstalled in the PC 1 is started. It is also possible to directly connect the audio player 5 to the PC 1. The method of connection is easy to understand to a user, and detailed explanation will be omitted.

Figure 3:
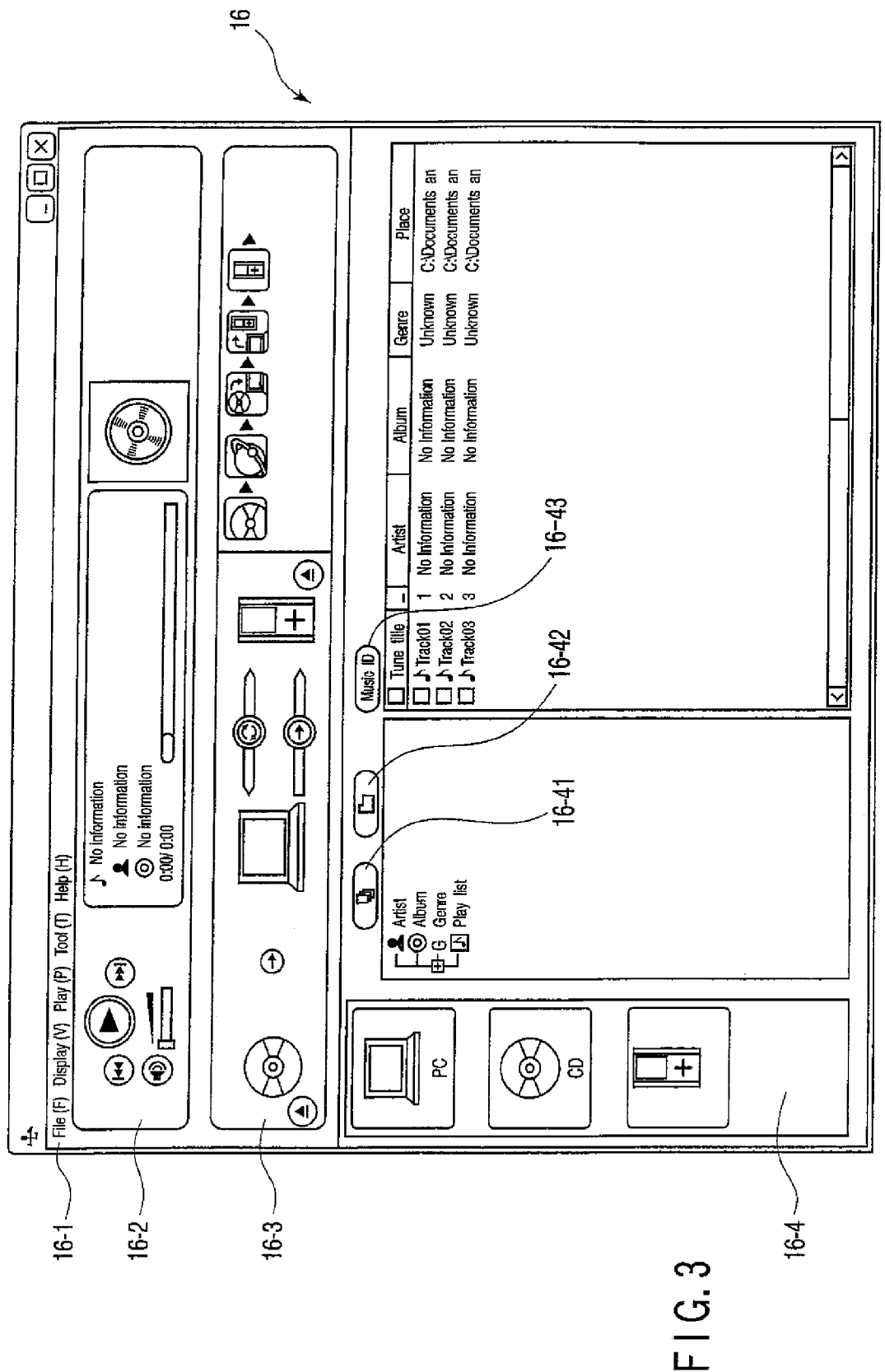
FIG. 3 is an exemplary diagram showing an example of a main menu of a contents management unit in the music contents transfer system according to an embodiment of the invention shown in FIG. 1.

In this state, a menu screen (main screen) is displayed on the display 16 of the PC 1, as shown in FIG. 3, and the contents (compressed music data) stored in the PC 1 can be transferred to the audio player 5.

The menu screen includes a GUI (Graphical User, e.g., Interface) permits to instruct for operating by the user a menu bar area displaying 16-1 an operation indicating panel area displaying 16-2 a transfer operation control panel area displaying 16-3, and a device connecting indicate panel area displaying 16-4.

The menu bar area displaying 16-1 used to select an operation mode, e.g., File (F), display (D), Play (P), Tool (T) and Help (H) each of the operation mode is described later. The operation indicating panel area displaying 16-2 to indicate an operating state, for example, play time up to now (passed time/total time (play time)), and a stored tune title. The transfer operation control panel area displaying 16-3 used to instruct a transfer (input a transfer state) to the audio player 5. The device connection indicating panel area displaying 16-4 used to switch and display a list of stored contents (music data) of the PCHDD 12 (PC main unit), optical disc (the optical disc stored in the current disc drive 13) and HDD 52 (audio player 5).

Figure 4:
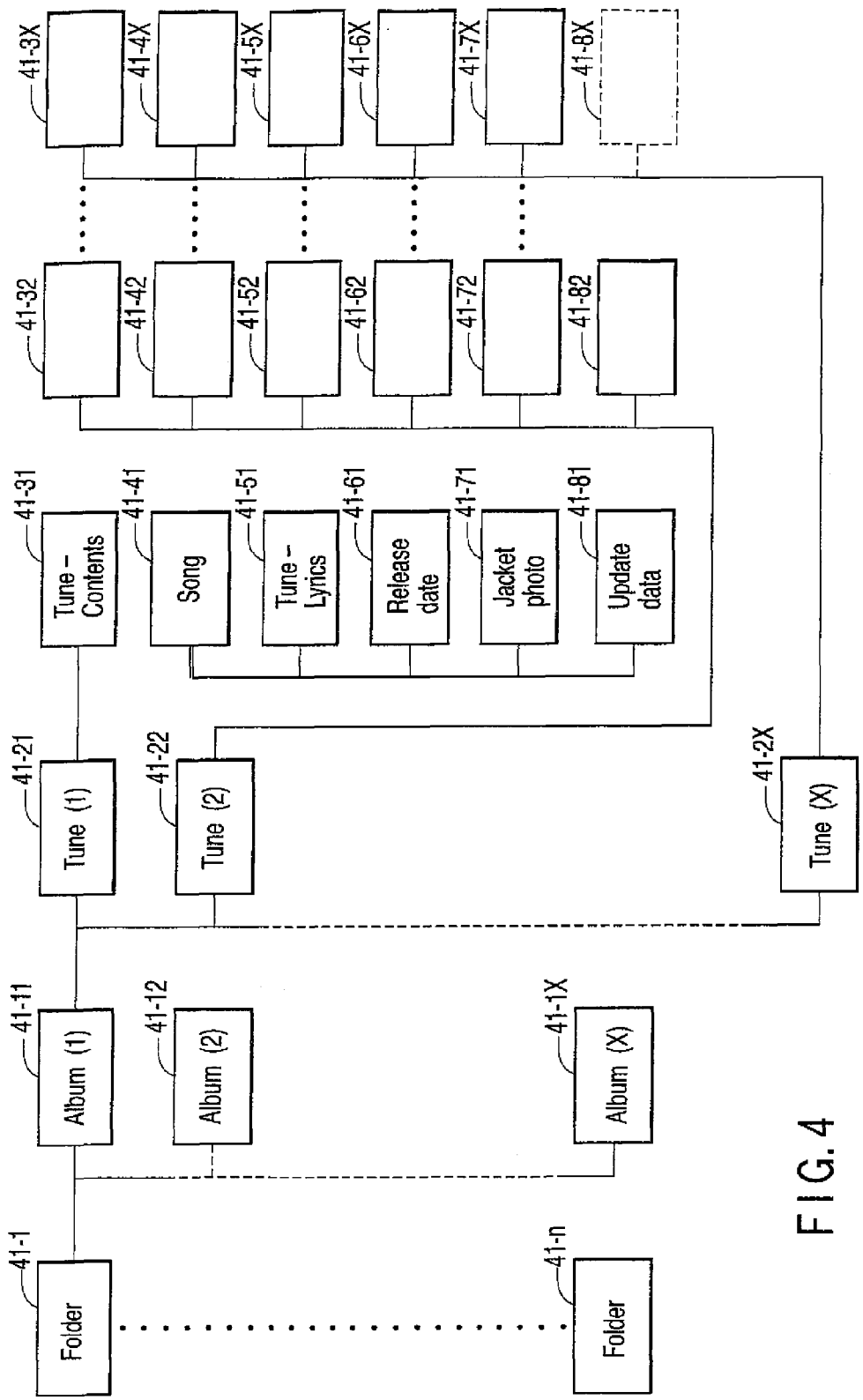
FIG. 4 is an exemplary diagram showing a contents management unit in the music contents transfer system according to an embodiment of the invention shown in FIG. 1, and an example of a data holding (storing) structure in a destination (player)

For example, the music data in the memory, unit specified through the device connection indicating panel area displaying 16-4 is displayed in a tree structure, explained layer with reference to FIG. 4 (by clicking the Display (button) on the display panel 16-4). The device connection indicating panel area displaying 16-4 instructs also a library view button area displaying 16-41 and a folder view button area displaying 16-42 used to switch the display of the contents list shown in a tree structure. The library view button area displaying 16-41 and folder view button area displaying 16-42 displays the selected library view of folder view, when any device is selected on the device connection indicating panel area displaying 16-4.

The server 121 of a distribution site is provided with a large capacity storage, which contains a large number of music contents. The music contents are given a tag information including an artist (singer name/player name), tune title, album title, jacket photo, words data, price of music contents, sales ranking data, and time information indicating the update date/time.

FIG. 4 shows an example of the data storing structure to store the music contents transferred from a PC to an audio player and additional information related to the music contents (e.g., an image file represented by a jacket photo), in the HDD of an audio player. The following data holding (storing structure) in the tree structure is almost the same in both PCHDD 12 of the PC 1 and HDD 52 of the player 5.

For example, a data storing structure corresponding to the library view is composed of folders 41-11 to 41-X specifiable by the album 1 to album X in the folders 41-1 to 41-n of the category specified by the artist A to artist n.

In the folders 41-11 to 41-1X of each album, the folders 41-21 to 41-2X of the tunes (n) (n: tune No.) contained (recorded) in that album are formed. For example, a folder or file (hereinafter called a tag information) storing various data, such as, tune-contents 41-31 to 41-3X Tune—Titles 41-41 to 41-4X, Tune—Lyrics 41-51 to 41-5X, release dates 41-61 to 41-6X, jacket photos (image files) 41-71 to 41-7X, and update data 41-81 to 41-8X are related. A file or folder of the update data 41-81 to 41-8X may not be prepared, because of the release period of an album (single), relation to the passed time (year/month) after the release, or server's management convenience.

Therefore, when an image file of a jacket photo (image) is added to the music data stored (contained) in the HDD 52 of the audio player 5, the jacket photo can be displayed in the display 5a while an optional tune of that album is being played back (or until the display is reset by the user).

When an album folder is formed for each tune and a jacket photo file is attached to each tune, namely, when music data is supplied from a one-tune supplier (source) generally called a single CD, a different jacket photo (image) is played back for each tune. As a jacket photo, data of a known file format, such as, JPG (JPEG), GIF and BMP can be used in many cases.

Next, explanation will be given on the update of music data or related information already transferred to the audio player 5, with reference to the flowchart of FIG. 5.

When the audio player 5 (removable device) is set in the cradle 50 in the state that the PC 1 (contents management unit) has been started, the connection of the audio player 5 is detected by the device identification program incorporated in the operation system of the PC 1, and an installed specific application program is started (S51).

Then, whether the connected (detected) audio player 5 (device) is an applicable device permitted (authenticated) to transfer data through the PC 1, is judged. This is useful for the PC 1 to manage the preparation of several same type players, sequential connection of these players, and copying music data, within a permitted range (S52).

After the device is authenticated, the database position (to be accessed) is switched to the audio player 5 (device). At this time, the information range registrable to the database of the player 5 is limited to within the player 5. This is useful for the PC 1 to manage the preparation of several same type players, sequential connection of these players, and copying music data, within a permitted range (S53).

Then, the database of the player 5 authenticated by the PC 1 is accessed (S54), and the data of the database of the PC 1 is sequentially compared with the data held by the player 5. In this time, in the tree structure examples shown in FIG. 4, the update data folder or the time information (update date/time) held as a file is used. Therefore, the contents not given the time information are not compared (S55).

As a result of the data comparison in step S55, if updated data (information) exists, or the data of the PC 1 includes the data having the time information later than the data of the player 5 (S56—Yes), the existence of updating data is noted (displayed) in at least one of the display 16 of the PC 1 and the display 5a of the player 5 (S57). In step S57, the data is displayed in the PC 1, but only the existence of the data may be indicated merely by a marker lamp (not shown) or icon (displaying) in the player.

Next, whether the user's update instruction exists in response to the notice of the existence of the updating data in step S57, is judged (S58). When the update button (not shown) is clicked (or selected from the operation unit 58 of the player 5) and a database update is instructed (S58—Yes), the PC 1 transfers the updating data to the player 5 (S59).

The time the update takes depends on the size (and the number of files) of the updating data, this time depends on the period (time) after the last update, but may be longer than 10 minutes. Thus, the data size and estimated transfer time may be displayed (or based on the user's confirmation) in the notice (displaying) of the existence of the updating data in step S57. In this case, a reference for the time taken for update (registration) is calculated from the number of files or the transfer rate cached on the storage (cache).

At least the steps S56 and S57 among the above mentioned steps can be controlled (executed) by the display 5a and operation unit 58 of the player 5. Therefore, the user can take in necessary information (update data) in the player 5 (selectively) by operating the player 5.

In this time, the data to be deleted by the update is once stored in an area for a deleted file (for example, the trash) of the HDD 52, and a message to prompt to deletion completely from the HDD 52 may be displayed in order to ensure the capacity of the HDD 52.

Moreover, an undesired update error can be decreased by displaying a message to the user that the device (player 5) can be removed after confirming that the update is reflected on the database, before actually removing the device.

Before transferring data to the player 5, it is also possible to connect the PC 1 to the server (distribution site) 121 through the network 111, check for the existence of updating data, and download the updating data to the PCHDD 12 of the PC 1.

In this case, the PC 1 can access the database of the server 121, when the update (music ID) button area displaying 16-43 is clicked in the menu screen explained in FIG. 3. When new data (contents) or new album exists in the server 121, whether to download the data of that contents (new album) is displayed in the display 16 of the PC 1 through the UI (User Interface). When downloading new contents, a default name is newly created to prevent overlap with an existing new file name.

When data is transferred to the audio player 5 (the database of the audio player 5 is updated), it is possible to access the database of the server 121 directly from the audio player 5 in the state that the PC 1 is connected to the server (distribution site) 121 through the network 111. In this case, it is also possible to selectively update the information related to the music data (contents) downloaded to the database of the audio player 5, for example, the data changed with time, such as sale amount.

Further the data in the storage, i.e., the cache in the PCHDD 12 or a specified area in a not-shown RAM can be processed by several applications, a time lag may be generated between the states of an actual file and a file has been stored in the database. Thus, the PC 1 (system) is set to give an update function to each application can update to synchronize the file has been stored in the database with the actual file. In this way, all applications capable of accessing the storage (processing the data) are updated of the actual file and the file has been stored to synchronize.

For easy management of the update history (to synchronize the update data), the time (date) information of the last update may be displayed on the display 16 (screen), when the time (date) information updated last is written in the tag information attached to music data (contents) and connected for the next update.

Further, at the time of update, the time (date) information may be field in the data resources or the tag information (so called meta-information) storing section of that time (date) information. The time (date) information may be filed in a part of a file name created based on the retrieved (outputted) data. The time (date) information shall be used as a retrieval item for updating the file has been stored in the database, only when using the information updated by connecting with the network. Since, it is difficult to apply the time (date) information to the update of the data from the contents supply source is a CD, for example, the time (date) information does not exist in many cases.

Only meta-data items (tag information) common to the headers of all media data (contents) are displayed in the display unit (UI) as retrieval items. Uncommon items are not displayed in normal mode (default), and shall be selected by the user on the select screen (only the item demanded by the user to display is displayed). At this time, the user is notified that the item is not included in some data headers.

It is also possible to provide an interface which requires the user to manually input the not-included item in the media data header. In this case, an area is required to save these items, and the header must be expanded. Therefore, when the header has an expansion areas that area is used. When there is no expansion area, a unique header is specified to save the metadata item. It is also possible to manage the item by compiling necessary information in another management file and relating the link information, instead of saving it directly as data.

As explained hereinbefore, invention makes it possible to display the date of the last connection to a network in a contents management unit (PC 1 or player 5), which has a function of registering (saving) the media information (the meta-information) of media data (music data and related data or contents) held in a database like a black box (the server 121 on the network) and a local device (player 5 or PC 1), on a database by using API. The contents management unit includes a function of updating a part of externally uncontrollable internal protocol from a server on the network. Further, an embodiment of the contents management unit includes a retrieving means to output data according to a certain externally uncontrollable rule made insides and can be retrieved by having an UI (display and input unit (operation unit)).

Information obtained from the network 111 (from the server 121 through the network 111) is updated when a settable and removable device (player 5) is connected to the contents management unit (PC 1).

At this time, the date information of the last update is displayed on an optional screen (display). The date information is embedded in the resources of the outputted data (retrieval result) and meta-information part. The date information is embedded in a part of the file name created based on the outputted data (retrieval result). The above processing is performed only when using the information updated through the network as a retrieval item.

Figure 5:
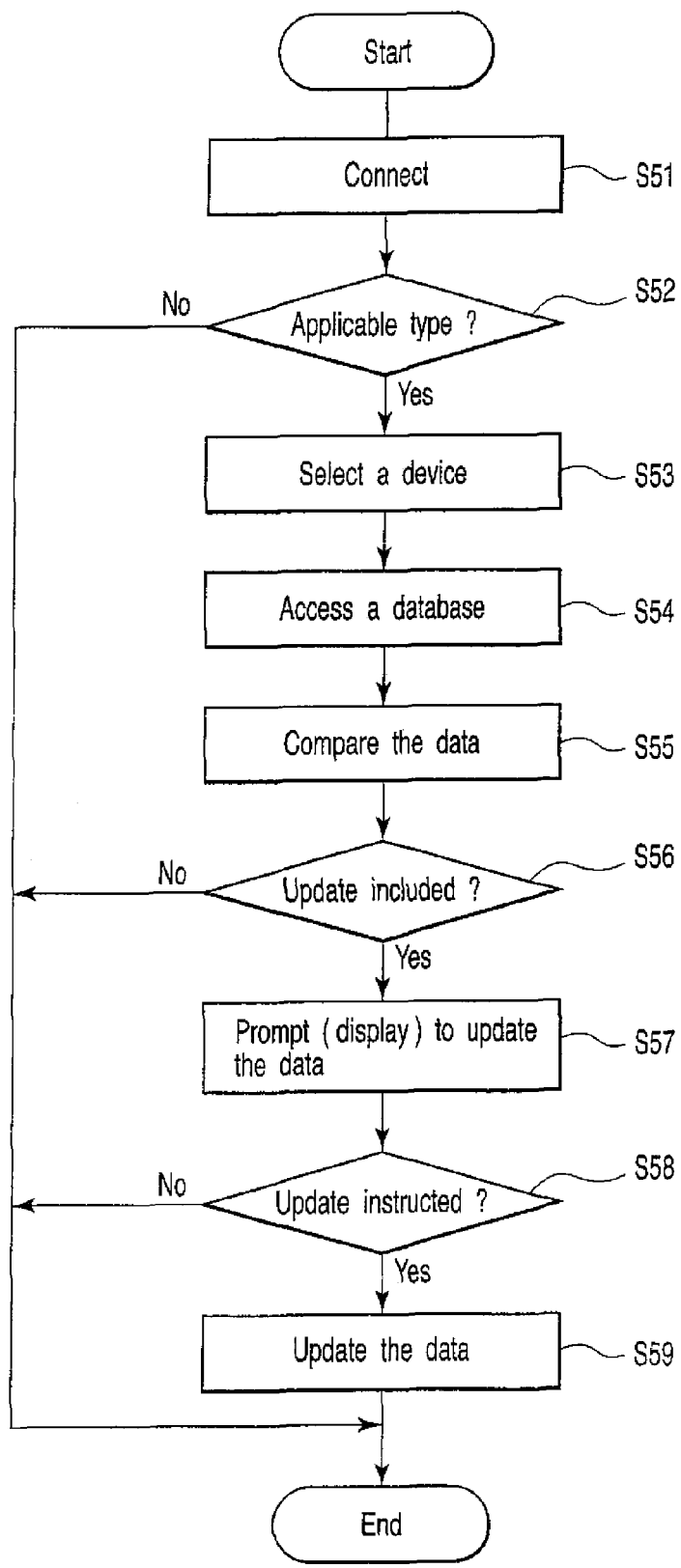
FIG. 5 is an exemplary showing an example of a data update procedure in the music contents transfer system according to an embodiment of the invention shown in FIG. 1.

The removable device (player 5) has an authenticating means to judge whether it is an applicable device or not by the contents management unit, when it is connected to the contents management unit (PC 1) (see, S51 of FIG. 5). When the removable device is authenticated, the device is selected as an applicable device, and the position of a database is switched to the removable device (player). At this time, the range of media information to be registered on the database of the removable device is limited to within the device (player).

When if the media information in the removable device is updated (an updating data exists), a message is displayed in the UI (display) instructs the user to update the data.

When a removable device is connected, a detection program detects the connection of the removable device, and starts a database update program.

The output of retrieval result and the comparison of data are performed for a play list defining a playback order and a display of classification by category (folders and files shown in a tree structure). Start of retrieval, update or registration of new data based on the retrieval result are possible by connecting the removable device to the media playback unit, and the database to register the information of media data on the removable device can be managed on the removable device.

When an update (creation or deletion of data) is instructed, an update, creation or deletion of unnecessary data can be done selectively.

A function of registering (updating) data on a database has the following features.

a) Registration of data on a database may take a long time when there are a large number of media, and whether to register data automatically can be selected by setting.

b) Especially, when the storage size is large and the media file size is not large relative to the storage size, a file exists in units of 1000-10000, and the registration may take a long time. Thus, when there are a large number of medial files, the default is manual, and the user makes a choice by the update button.

c) The time taken by registration is previously calculated from the number of media files on the storage, and displayed in the UI.

d) When the storage size is relatively small or the media file size is large relative to the storage size, the number of files is decreased, and an automatic update can be set by default.

e) When the default is a manual update, there is a means of informing the user of the update timing. The date of the last database update is compared with the date of the last data transfer, and when the last database update is older than the last data transfer, the user is prompted to update the data. Therefore, the date of the last transfer is recorded in a set file and a database.

f) When there is more than one storage in a system, a default storage is defined and a database is managed on the default storage. A database is not managed for each storage.

g) When a device is removable, a database is managed for each device as one unit.

h) In the device removing process, a message that the device can be removed is displayed for the user, after the update is completely.

i) When there is a possibility that several devices are connected to the apparatus (PC 1) by managing a database for each device, management is possible for each device, data management can be simplified, and an update (registration) for a device not authenticated can be prevented.

A function of retrieving data has the following features.

A) Only a metadata item common to all header areas of all media data is displayed in the UI (User Interface, a display in this example) as a retrieval item, and an uncommon item is not displayed in standard, and selected on the select screen and displayed.

B) In the above case, the user is notified that the item is not included in a header area of some media data.

C) An interface capable of entering a not-included item in a header area of media data, under the user's control (manually), is provided.

D) In this case, an area to save these items becomes necessary, and a function for expanding a header area is provided.

E) When an expansion area exists in a header area, the area is used. When an expansion area does not exist, a unique header is defined to save a metadata item.

F) It is also possible to create another management file and manage necessary information altogether, without saving directly as data.

When a change (update) occurs in a play list as a result of retrieval, u) Save in another management file, when a play list is created by a retrieving means, or v) Save by dividing for each play list and save in files, or save in another management file, and w) When another management file is created, it is possible to change automatically a default name of a new play list name according to a fixed rule, not to overlap with an already created file name.

As explained above, the present invention makes it possible to easily update music data containable (storable) in a portable music playback unit, and various related information, without a troublesome procedure.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A contents management unit comprising:
    a communication unit configured to connect to a data supplier and an information playback terminal, and configured to transfer data obtained from the data supplier to the information playback terminal, when the information playback terminal is connected;
    a first data storage configured to store at least an update date/time;
    a second data storage configured to store the obtained data; and
    a data transfer controller, which when the updated data/time has the time information that is later than the data of the information playback terminal and when the data supplier and the information playback terminal are both connected the communication unit at a same time, is configured to refer to the update date/time stored in the first data storage, and to determine whether to overwrite the obtained data stored in the second storage with respect to the update date/time stored in the first data storage.

2. The contents management unit of claim 1, wherein the data transfer controller permits to the information playback terminal, at a point of time that the information playback terminal is connected through a connectable communication unit.

3. The contents management unit of claim 2, wherein the data transfer controller permits refers to time information attached to data.

4. The contents management unit of claim 3, wherein the data transfer controller notify an existence of data to be updated, when confirming that an updating data exists in the data of the data supplier held by the information playback terminal.

5. The contents management unit of claim 3, wherein the data transfer controller transfers data, when confirming that an updating data exists in the data of the data supplier by the information playback terminal, and receiving an update input.

6. A method for update of contents comprising:
    comparing data stored update data/time storage in a player and data stored in a database, each connecting through a manager at a same time;
    notifying that updated data exists, if the data stored in the database includes the data having the time information later than the data stored update data/time storage in the player; and
    starting an update, if an update instruction exists; and
    transferring the updated data to the player.

7. The method of claim 6, wherein the transfer of the updated data is configured to automatically begin, if both of the player and the database are connected the manager at a same time.

* * * * *